United States Patent
Sullivan

(10) Patent No.: US 7,665,147 B2
(45) Date of Patent: Feb. 16, 2010

(54) AUTHENTICATION OF HTTP APPLICATIONS

(75) Inventor: Bryan Sullivan, Sammamish, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 226 days.

(21) Appl. No.: 10/773,555

(22) Filed: Feb. 5, 2004

(65) Prior Publication Data

US 2005/0187890 A1 Aug. 25, 2005

(51) Int. Cl.
G06F 7/04 (2006.01)
G06F 17/30 (2006.01)

(52) U.S. Cl. ............... 726/29; 726/2; 713/168; 713/170; 707/705

(58) Field of Classification Search ........ 726/2, 726/12, 27, 28, 29, 30; 707/999.006; 713/168, 713/170
See application file for complete search history.

(56) References Cited

U.S. PATENT DOCUMENTS

| | | | | |
|---|---|---|---|---|
| 6,460,081 B1* | 10/2002 | Doherty et al. | ............ | 709/225 |
| 6,463,533 B1* | 10/2002 | Calamera et al. | ............ | 713/163 |
| 6,609,154 B1* | 8/2003 | Fuh et al. | ............ | 709/225 |
| 6,954,801 B1* | 10/2005 | Housel | ............ | 709/247 |
| 6,981,262 B1* | 12/2005 | DeMello et al. | ............ | 719/310 |
| 7,035,850 B2* | 4/2006 | Arai et al. | ............ | 707/6 |
| 7,069,433 B1* | 6/2006 | Henry et al. | ............ | 713/151 |
| 7,131,144 B2* | 10/2006 | Rabin et al. | ............ | 726/30 |
| 7,237,125 B2* | 6/2007 | Raley et al. | ............ | 713/193 |
| 2003/0033524 A1* | 2/2003 | Tran et al. | ............ | 713/168 |
| 2003/0110234 A1* | 6/2003 | Egli et al. | ............ | 709/217 |
| 2003/0177236 A1* | 9/2003 | Goto et al. | ............ | 709/225 |
| 2003/0196109 A1* | 10/2003 | Raley et al. | ............ | 713/200 |
| 2004/0003293 A1* | 1/2004 | Viets et al. | ............ | 713/201 |
| 2004/0205199 A1* | 10/2004 | Gormish | ............ | 709/229 |
| 2005/0014489 A1* | 1/2005 | Zhigang | ............ | 455/414.2 |
| 2005/0108528 A1* | 5/2005 | Wanish et al. | ............ | 713/168 |
| 2005/0257056 A1* | 11/2005 | Morita et al. | ............ | 713/170 |
| 2007/0289026 A1* | 12/2007 | Newcombe et al. | ............ | 726/29 |

FOREIGN PATENT DOCUMENTS

WO   WO 02/15531 A1 * 2/2002

* cited by examiner

*Primary Examiner*—Charles Rones
*Assistant Examiner*—Phuong-Thao Cao
(74) *Attorney, Agent, or Firm*—Moazzam & Associates, LLC

(57) ABSTRACT

An apparatus such as an HTTP proxy server compares information of a request by HTTP client logic with a known pattern of information for the client logic. When the information of the request matches the known pattern, the HTTP proxy server causes content and/or software to be communicated to the client in response to the request. Depending upon the results of the comparison, the HTTP proxy may also validate or invalidate the request before communicating it to the server.

18 Claims, 8 Drawing Sheets

AUTHENTICATION OF HTTP APPLICATIONS

TECHNICAL FIELD

The present disclosure relates to software application authentication.

BACKGROUND

Software and content piracy are significant problems. Each year, artists and software developers lose large sums of money to pirates who duplicate and/or distribute software and content without reimbursement to the owners. The advent of large-scale computing networks, such as the Internet, has exacerbated the problem, because content and software may be duplicated and distributed by pirates quickly and easily over large geographic areas.

Increasingly, content and software are being made available via wireless telephones. Wireless telephones are devices capable of transmitting and receiving voice and/or data (non-voice) information to and from a network without the use of wires, cables, or other tangible transmission media. So-called cellular telephones are a common example of wireless phones.

Wireless telephones and the networks by which they communicate operate according to various technologies, including analog mobile phone service (AMPS), circuit switching, packet switching, wireless local area network (WLAN) protocols such as IEEE 802.11 compliant networks, wireless wide-area networks (WWAN), short-range RF systems such as Bluetooth, code division multiple access (CDMA), time division multiple access (TDMA), frequency-division multiplexing (FDM), spread-spectrum, global system for mobile communications (GSM), high-speed circuit-switched data (HCSD), general packet radio system (GPRS), enhanced data GSM environment (EDGE), and universal mobile telecommunications service (UMTS). Of course, these are only examples, and other technologies may be employed in wireless communication as well.

Herein, the term 'wireless device' is meant to include wireless telephones (including cellular, mobile, and satellite telephones), and also to include a variety of other wireless devices, including wireless web-access telephones, automobile, laptop, and desktop computers that communicate wirelessly, and wireless personal digital assistants (PDAs). In general, the term 'wireless device' refers to any device with wireless communication capabilities. A wireless device may be a 'client device', which is any device that provides requests for services from a network. A 'server device' is a device of the network that receives and responds to client device requests. Of course, depending upon the circumstances, a client device may act as a server device, and vice versa.

Many companies produce wireless telephones and other wireless devices. Among the more well-known producers are Nokia®, Ericsson®, Motorola®, Panasonic®, Palm® Computer, and Handspring®. A variety of producers also provide wireless devices comprising versions of the Microsoft® Windows® operating software.

One method of content and software duplication involves "downloading", whereby a client device (such as a personal computer, music player, wireless telephone, and so on) communicates with a server device to obtain a copy of content and/or software available via the server device. Various protocols are available for downloading, including Hypertext Transfer Protocol (HTTP) and File Transfer Protocol (FTP).

Client logic is software of the client device that makes requests to the server for content/software. To prevent unauthorized behavior and/or piracy, the server may authenticate the client logic before fulfilling the requests. Where the client and server communicate via HTTP, the server may refer to the "User Agent" HTTP header for an identification of the client logic. For example, the HTTP header may identify the client logic as "WAP Browser for Nokia Phones version 1.5". The server may provide the requested content/software only to authorized client logic. Communication service providers (such as AT&T Wireless Services and other entities that provide wireless communications to subscribers) may enter into arrangements with content and software providers to provide content and/or software for subscribers of the service providers. Thus, content and software (such as ring tones and games for a wireless telephone) may be provided by the server to a "WAP Browser for Phones" but not to another browser application that is not authorized to receive this content and software.

A problem with this approach is that authorized client logic may be "spoofed" by unauthorized client logic. For example, HTTP client logic may set the User-Agent header to identify itself to an HTTP server as an authorized client logic for content and software, when in fact the application is not so authorized.

SUMMARY

The following summary is intended to highlight and introduce some aspects of the disclosed embodiments, but not to limit the scope of the invention. Thereafter, a detailed description of illustrated embodiments is presented, which will permit one skilled in the relevant art to make and use aspects of the invention. One skilled in the relevant art can obtain a full appreciation of aspects of the invention from the subsequent detailed description, read together with the figures, and from the claims (which follow the detailed description).

An apparatus acting as an HTTP proxy server, such as a Wireless Application Protocol (WAP) proxy/gateway, compares information of a request by client logic with a known pattern of information for an HTTP client logic, and when the information of the request matches the known pattern, causes content and/or software to be communicated to the client in response to the request. The apparatus may apply information provisioned to a client device comprising the HTTP client (such as a wireless phone or other wireless device) to interpret at least a portion of the information of the request. The interpreted information of the request may be compared to information of the request identifying the client logic. The HTTP proxy may also validate or invalidate the request according to the result of the comparison.

BRIEF DESCRIPTION OF THE DRAWINGS

The headings provided herein are for convenience only and do not necessarily affect the scope or meaning of the claimed invention.

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

The invention will now be described with respect to various embodiments. The following description provides specific details for a thorough understanding of, and enabling description for, these embodiments of the invention. However, one skilled in the art will understand that the invention may be practiced without these details. In other instances, well known structures and functions have not been shown or described in detail to avoid unnecessarily obscuring the description of the embodiments of the invention. References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Herein, "logic" refers to any information having the form of instruction signals and/or data that may be applied to affect the operation of a processing device (processor). Examples of processors are computer CPUs (central processing units), microprocessors, digital signal processors, controllers and microcontrollers, and so on. Logic may be formed from signals stored in a device memory. Software is one example of such logic. Examples of device memories that may comprise logic include RAM (random access memory), flash memories, ROMS (read-only memories), EPROMS (erasable programmable read-only memories), and EEPROMS. Logic may also be comprised by digital and/or analog hardware circuits, for example, hardware circuits comprising logical AND, OR, XOR, NAND, NOR, and other logical operations. Herein, software is distinguished from hardware in that software does not comprise hardware elements, whereas logic may be formed from combinations of software and hardware.

Figure 1:
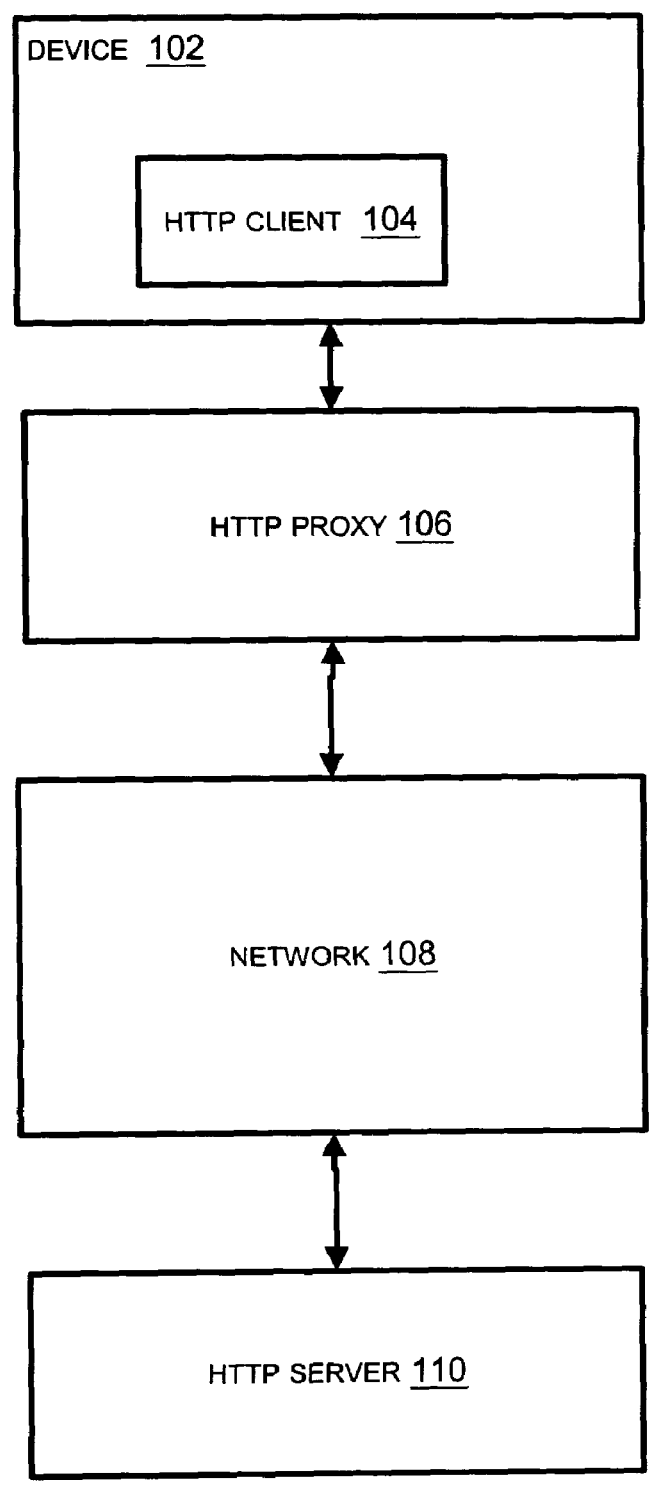
FIG. 1 is a block diagram of an embodiment of an HTTP communication arrangement.

FIG. 1 is a block diagram of an embodiment of an HTTP communication arrangement. A client device 102 comprises HTTP client logic 104, e.g. logic to provide HTTP communications with a server. The client device 102 communicates (wirelessly or via wires, cables, or other means) with an HTTP proxy 106. The HTTP proxy 106 represents the HTTP client 102 in HTTP communications with the network 108 (providing anonymity, security, and other benefits). The network 108 provides for communications between the HTTP proxy 106 and an HTTP server 110. The HTTP server 110 provides the HTTP client 104 with access to content and/or software via HTTP communications.

Figure 2:
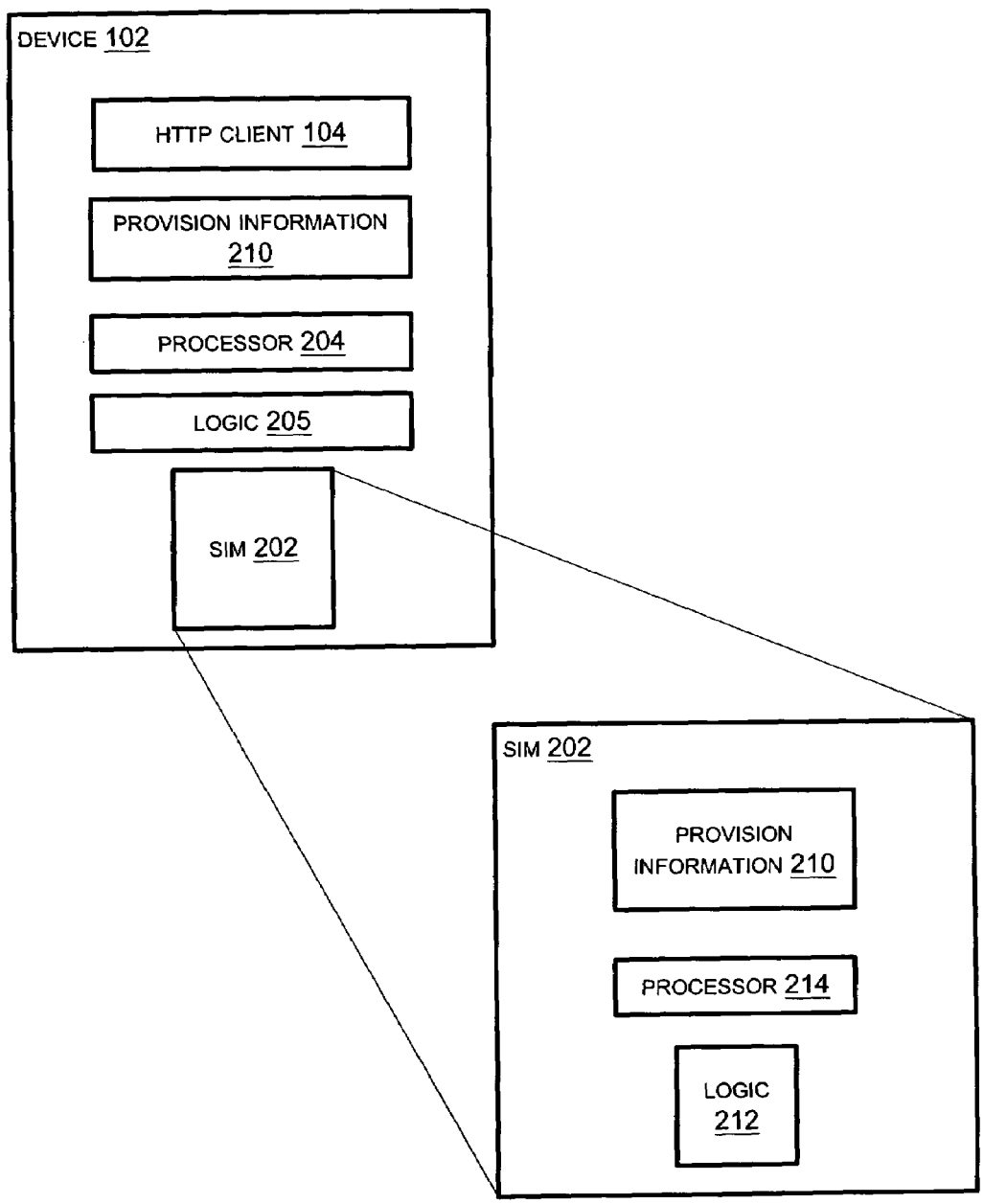
FIG. 2 is a block diagram of an embodiment of a client device.

FIG. 2 is a block diagram of an embodiment of a client device. The client device 102 comprises the HTTP client 104, provision information 210, operational logic 205, a processor 204, and a Subscriber Identity Module (SIM) 202. The SIM 202 identifies a subscriber of the network 108 by which the client device 102 communicates. A "subscriber" represents one or more persons or entities (corporations, partnerships, agents, operators, etc.) with access privileges to the network 108. A subscriber may be or represent a single user, or may represent one or more users. "User" refers to any person (or, conceivably, autonomous or semi-autonomous logic) with access privileges to the network 108. Typically the user is the operator of the client device 102, although a user could also be the operator of a device or devices that provide services via the network.

Some client devices 102 may not employ a SIM 202. In such devices a subscriber is typically associated with the client device 102 via logic 205 of the client device.

The logic 205 is applied to the processor to operate the client device 102. The HTTP client logic 104 is applied to the processor to provide HTTP communication with the network 108.

The provision information 210 is information communicated from the network 108 to the client device 102 and stored therein. For example, the provision information 210 may include an International Mobile Station Identifier (IMSI) for the device.

In some embodiments, the SIM 202 comprises a processor 214 and logic 212. The logic 212 of the SIM 202 may be applied to the processor 214 to operate the SIM 202 in cooperation with the operation of the client device 102. The SIM 202 may also comprise provision information 210. When the provision information 210 is comprised by the SIM 202, the provision information 210 may be portable among different client devices 102 (by decoupling the SIM 202 from one device and coupling it with another). When no SIM is present, the provision information 210 is comprised by the client device 102.

Figure 3:
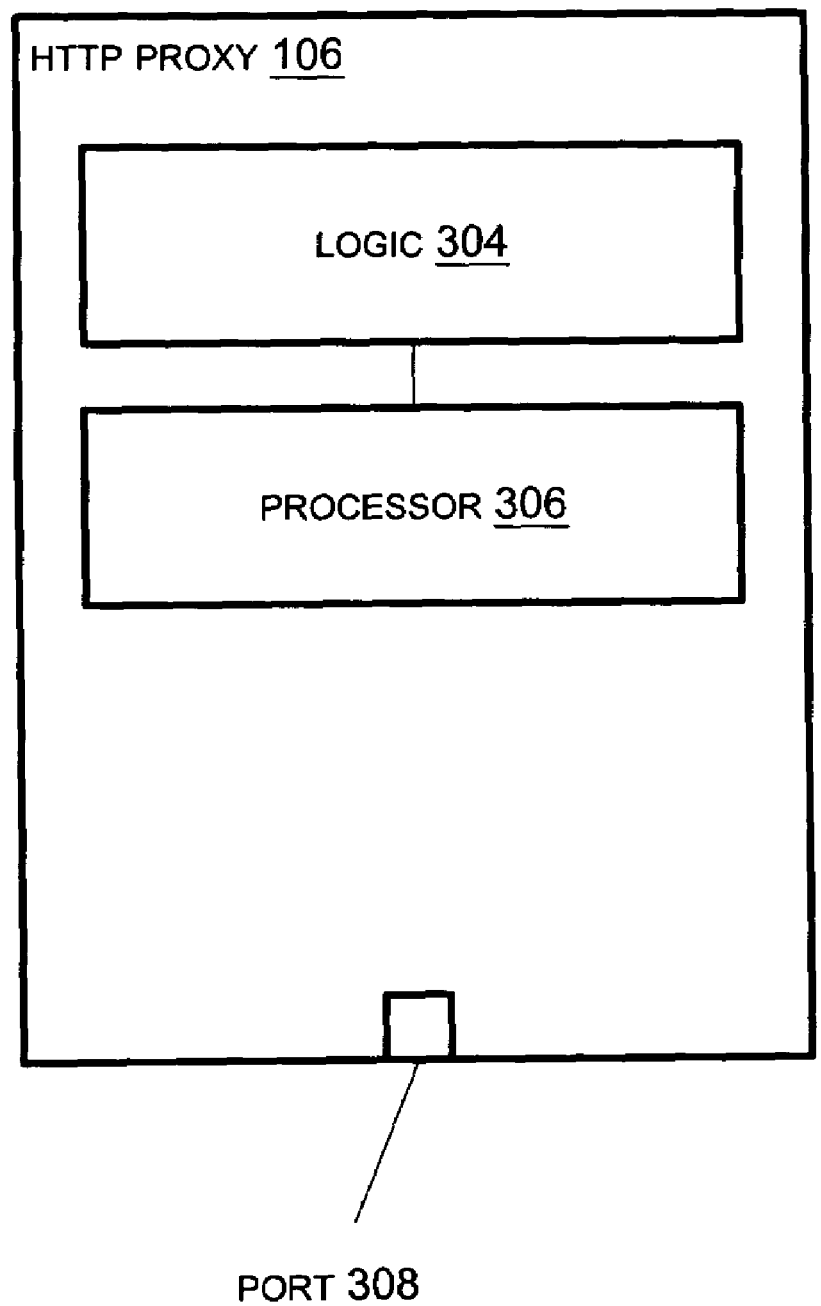
FIG. 3 is a block diagram of an embodiment of an HTTP proxy.

FIG. 3 is a block diagram of an embodiment of an HTTP proxy 106. The proxy 106 comprises a processor 306 and HTTP proxy logic 304 that, when applied to the processor 306, provides HTTP proxy services, may also perform authentication of the HTTP client 104 as described herein. The proxy 106 comprises at least one port 308 by which HTTP communications may take place.

Figure 4:
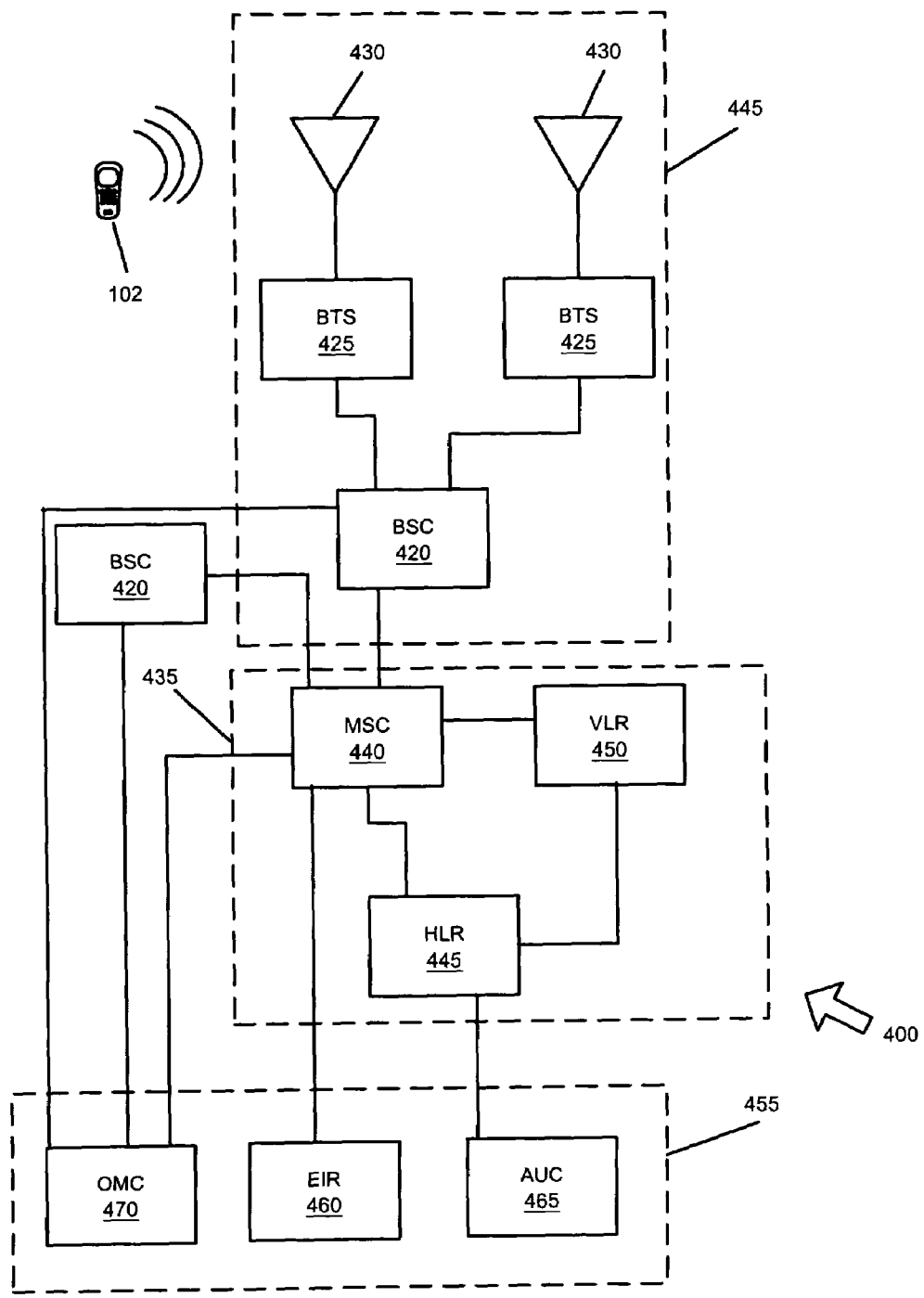
FIG. 4 is a block diagram of an embodiment of a wireless communication network.

FIG. 4 is a block diagram of an embodiment of a GSM network. Other types of communications networks, such as GPRS networks and networks of mixed technology, may also be employed. In the GSM network, a client device 102 communicates with a base station subsystem (BSS) 445 comprising base station controllers (BSC) 420 coupled to one or more base transceiver stations (BTS) 425. In turn, each BTS 425 is coupled to one or antennae 430.

The BTS 425 includes transmitting and receiving equipment to create a radio interface between the wireless network and terminal devices. Although the antennae 430 are shown as separate elements for clarity, it is common in the industry to collectively refer to the antennae 430, transmitter, and receiver, as the BTS.

The BSC 420 may perform management of the radio interface by allocating channels, managing handover from one BTS to another, paging the wireless device, and transmitting connection-related signaling data.

The networking and switching subsystem (NSS) 435 of a wireless network comprises a Mobile Switching Center (MSC) 440, a Home Location Registry (HLR) 445, and a Visitor Location Registry (VLR) 450. Switching and network management functions are carried out by the NSS 435. The NSS 435 may also act as a gateway between the wireless network and other networks such as the Public Switched Telephone Network (PSTN), Integrated Services Digital Network (ISDN), the Internet, corporate intranets, other wireless networks, and the Public Data Network (PDN).

The MSC 440 is a switching mechanism that routes communications and manages the network. In GPRS networks, GPRS support nodes (GSNs) such as Switching GSNs (SGSNs) and Gateway GSNs (GGSNs) may provide switching operations similar to those provided by the MSC 440. There can be many switches 440 in a communication network, each responsible for the signaling required to set up, maintain, and terminate connections to wireless devices within the geographical area served by the switch 440. Each MSC (switch) 440 may manage several BSC 420. The MSC 440 is coupled to a Home Location Registry (HLR) 445 and a Visitor Location Registry (VLR) 450. The HLR 445 is also coupled to the VLR 450. The HLR 445 and VLR 450 may comprise certain dynamic or temporary subscriber data such as current Location Area (LA) of the subscriber's mobile station and Mobile Station Roaming Number (MSRN). Subscriber-related data is recorded in the HLR 445 from which billing and administrative information is extracted when needed by the cellular service provider. Some wireless networks have only one HLR 445 that serves all subscribers; others have multiple HLRs.

The MSC 440 uses the VLR 450 to manage the wireless devices that are currently roaming in the area controlled by the MSC 440. The VLR 450 stores information such as the International Mobile Subscriber Identity (IMSI), authentication data, and telephone number of the roaming wireless devices. The VLR 450 may obtain and comprise subscriber information, such as information about the services to which a roaming wireless device is entitled, from the HLR that serves the wireless device. The VLR 450 controls a pool of MSRN and allocates an MSRN and TMSI to the roaming wireless device. The VLR 450 sends the MSRN and Temporary Mobile Subscriber Identity (TMSI) information to the HLR 445 where they are stored with the subscriber's dynamic records for later use in call routing.

The operation subsystem (OSS) 455 may include an Equipment Identity Register (EIR) 460, an Authentication Center (AuC) 465, and an Operating and Maintenance Center (OMC) 470. The OSS 455 may provide subscription management, network operation, network maintenance, and mobile equipment management.

The AuC 465 stores data related to network security and authentication of wireless devices and subscribers. A purpose of the AuC 465 is to prevent fraud by verifying the identity of subscribers and/or devices that try to access the network. Thus the AuC 465 may comprise authentication algorithms and encryption codes necessary to protect a subscriber's access rights and identity and to prevent eavesdropping.

The EIR 460 is a database which stores International Mobile Equipment Identity (IMEI) numbers. Wireless devices are uniquely identified by an IMEI or equivalent number such as an Electronic Serial Number (ESN). An EIR 460 generally indicates the status of a particular wireless device by flagging the IMEI of a device identified stolen, suspended, or malfunctioning.

The OMC 470 monitors and controls other network elements to enhance system performance and quality. The OMC 470 also administers billing, subscriber service data, and generation of statistical data on the state and capacity of the network.

Figure 5:
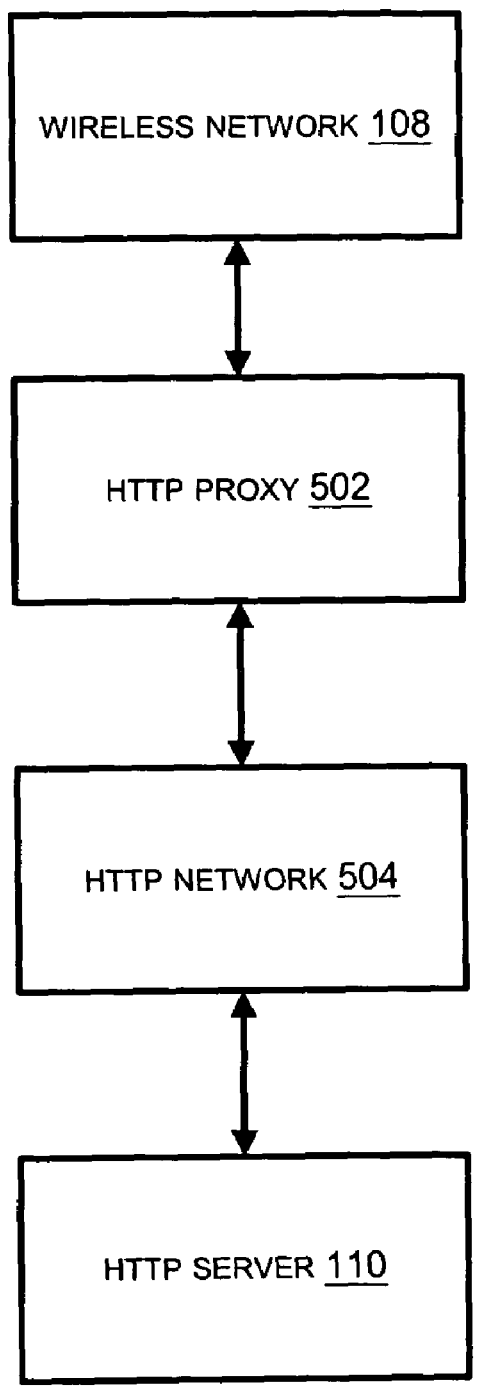
FIG. 5 is a block diagram of an embodiment of a coupling of a wireless network to an HTTP network.

FIG. 5 is a block diagram of an embodiment of a coupling of a network to an HTTP network. An HTTP network 504 is a network by which HTTP communication may take place. The network 108 is coupled to an HTTP proxy 502, by which the network 108 may communicate with the HTTP network 504. The HTTP proxy 502 provides an interface between wireless network protocols and services, and Internet protocols and services. For example, the HTTP proxy 502 could provide an interface whereby communications from the HTTP server 110 involving Internet Protocol (IP), HTTP, and/or FTP, to name just a few, are communicated to the network 108 via Signaling System 7 (SS7) or other network communication methods. Communications from the network 108 involving SS7 or other wireless network protocols may likewise by converted by the HTTP proxy 502 to protocols supported by the HTTP network 504.

Figure 6:
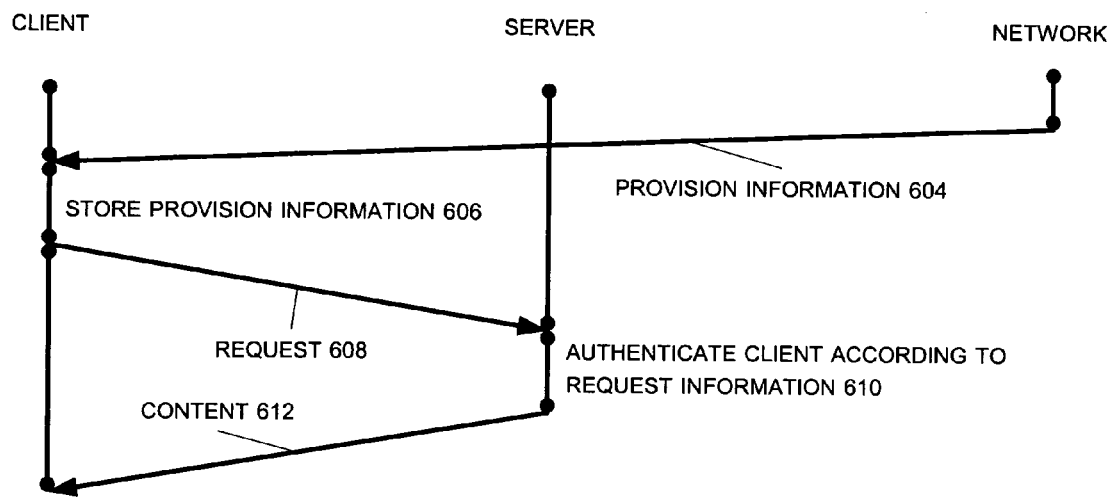
FIG. 6 is an action diagram of an embodiment of a method of authenticating an HTTP application.

FIG. 6 is an action diagram of an embodiment of a method of authenticating client logic. At 604 a network, such as a wireless network, communicates provision information to a client, and the client stores the provision information at 606. At 608 the client communicates a request to the server (e.g. an HTTP proxy server, or the HTTP server itself). The request comprises particular headers, in a particular sequence, comprising particular values. The client may include at least some of the provision information in the request. At 610 the server authenticates the client logic according to the information provided in the request. For example, the particular headers, sequence of the particular headers, and content of the particular headers provided in the request may strongly identify particular client logic. At 612 content (and/or software) requested by the client is provided by the server to the client, provided that the client is authenticated as a client that is authorized to receive the content and/or software.

Figure 7:
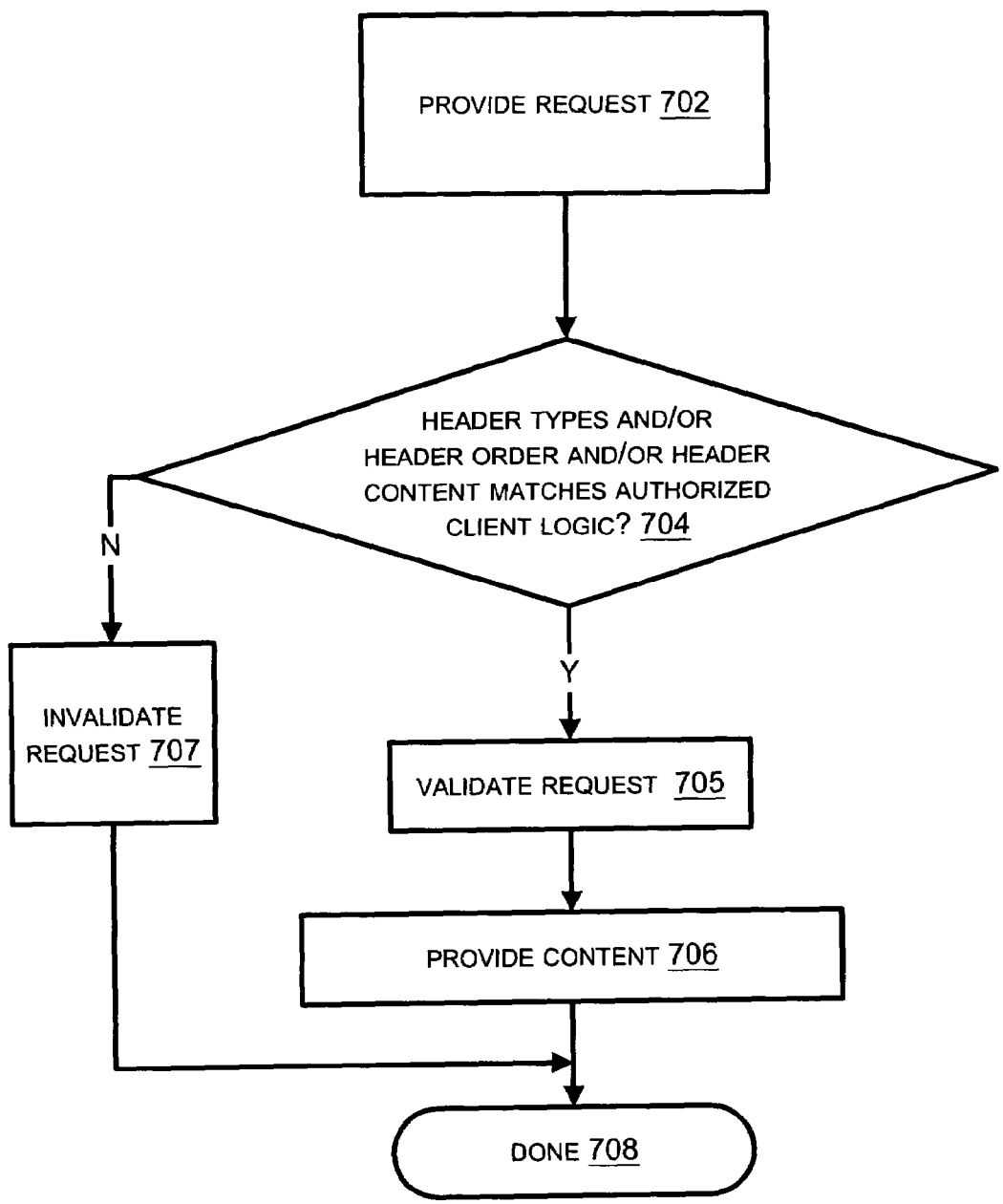
FIG. 7 is a flow chart of an embodiment of authenticating an HTTP application.

FIG. 7 is a flow chart of an embodiment of a method of authenticating client logic. At 702 the request information is provided to a server. At 704 a check is made to determine whether header types and/or header order and/or header content of the request matches known header patterns of a client that is authorized to receive the requested content (and/or software). If there is a match with an authorized client, the request is validated at 705, and in response to the valid request, the content is provided at 706. A Otherwise the request is invalidated at 707, the content is not provided, and the method concludes at 708. A validated request is a request that has a form and content such that the server acts to fulfill the request. For example, a validated request may contain a key or other authentication information to indicate that the request comes from an authorized client and should be fulfilled.

By way of example, HTTP client logic conforming to Wireless Application Protocol Version 2.0 (WAP2) may communicate an HTTP request as a series of text strings separated by carriage return and line feed characters (e.g. lines). The first line may be the HTTP method (e.g. GET, HEAD, POST, etc.) containing the Universal Resource Identifier (URI) and the protocol version. The method line may be followed by a series of header lines, then the body of the request (the body is typically only present when uploading data via the "POST" or "PUT" methods). In general, various headers may be provided, in different orders, with differing values. However, at least some of the set of headers provided, and the header order, and the header values, are predictable for specific HTTP clients. The following sets of headers, header order, and header values may be provided by a WAP2 browser:

```
GET http://home/ HTTP/1.1
Accept: text/vnd.wap.wml, application/vnd.wap.wmlscriptc,
application/*, application/xhtml+xml, image/vnd.wap.wbmp,
image/gif, image/jpeg, image/png, text/html, text/x-
vCalendar, text/x-vCard, text/css, multipart/*, text/x-co-
desc, text/vn
Accept-Charset: ISO-8859-1, US-ASCII, UTF-8;q=0.800, ISO-
10646-UCS-2;q=0.600
Accept-Language: English, Finnish
x-wap-profile:
http://myclient.profile.com/uaprof/myclient.xml
Cookie2: $Version="1"
Proxy-Connection: Keep-Alive
User-Agent: myclient/2.0 Profile/MIDP-1.0 Configuration/CLDC-
1.0
Host: home
```

The "Accept" header identifies the MIME types (content formats) supported by the client logic and the client device that is executing the client logic.

The "Accept-Charset" header identifies the character sets that the application supports.

The "Accept-Language" header identifies the languages that the application supports.

The "x-wap-profile" header is a WAP2-specific header that identifies the location of the User Agent Profile (detailed device capability information) for the client device.

The "Cookie2" header advises the HTTP server that the application understands "new-style" cookies.

The "Proxy-Connection" header requests that the HTTP server keep the connection open between the application and the server, by communicating periodic Transmission Control Protocol (TCP) "keep-alive" packets.

The "User-Agent" header identifies the HTTP client logic, and is unique to the client logic. It may include information about the vendor, client code source, version, and client device.

The "Host" header is a request-specific header that identifies where the requested URI is located.

The HTTP client may provide a header including information derived from provision information. The following is one example of such a header.

```
x-ATTWS-client:
    vgxuyg239y0fcwecx235136scxdw0988iwuefc0iajs0fcqe0ciq
```

The header is named "x-ATTWS-client", but it could have any name different than the names of other headers. The value "vgxuyg239y0fcwecx235136scxdw0988iwuefc0iajs0fcqe0ciq" may be an encoded representation of the User Agent or other header. The encoding may be based upon provision information, such as the IMSI. The HTTP proxy may interpret the header and compare the result with the User Agent header provided by the HTTP client, to authenticate the HTTP client. The value "vgxuyg239y0fcwecx235136scxdw0988iwuefc0iajs0fcqe0ciq" may also be a secret, predetermined "signature" value provisioned in the client device (communicated from the network to the client device and stored therein).

Although various examples are presented involving HTTP as used by WAP2 clients, similar techniques may be applied to any communication protocol. For example, the header set, sequence, and content of a WAP Version 1.2.1 Wireless Session Protocol (WSP) connect request may be examined to authenticate a WSP client.

Figure 8:
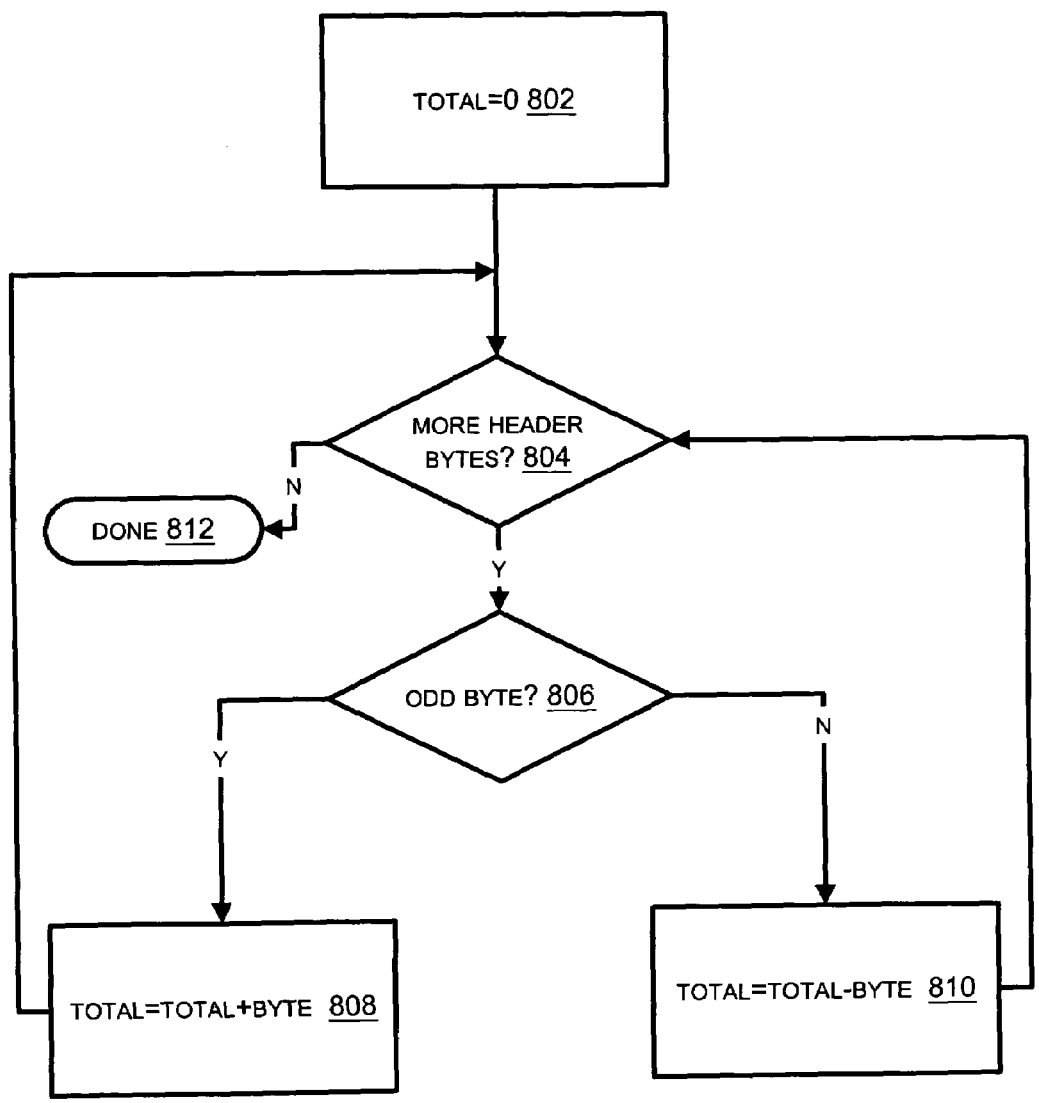
FIG. 8 is a flow chart of an embodiment of a method of authenticating an application according to the total content of a protocol request.

FIG. 8 is a flow chart of an embodiment of a method of authenticating client logic according to the total content (header set, header order, and header content) of a protocol request. At 802 a total is set to zero or some other initial value. At 804 it is determined whether there are more header bytes to consider. If not, the method concludes at 812. If there are more header bytes to consider, a check is made at 806 to determine whether the byte under consideration is an odd number or even numbered byte. If the byte under consideration is an odd numbered byte, the byte value is added to the total at 808. Otherwise the byte value is subtracted from the total at 810. The final total provides a reasonable authentication of the client logic according to the entire content of the request.

Of course, header information may be processed in information units other than bytes. For example, header information may be processed in words, double words, and so on, depending upon the nature and requirements of the processor and software employed.

What is claimed is:

1. A method of authentication, the method comprising:
   connecting a wireless network to an HTTP network using an HTTP proxy;
   converting wireless network protocols from the wireless network into a protocol supported by the HTTP network;
   comparing information, consisting of header types, a header order, and a header content, of a request by client logic with a known pattern of information for the client logic to determine whether a device making the request is authorized to receive at least one of content and software, the comparing accomplished by the HTTP proxy, wherein the header types, the header order, and the header content strongly identify the client logic; and
   when the information of the request matches the known pattern, causing the at least one of content and software to be communicated to the client logic in response to the request.

2. The method of claim 1, further comprising:
   the known pattern selected according to an identification of the client logic provided with the request.

3. The method of claim 1, further comprising:
   the request comprising an HTTP GET request.

4. The method of claim 1, further comprising:
   the known pattern of information comprising a value determined by combining information of the request.

5. The method of claim 1, further comprising:
   the HTTP proxy causing an HTTP server to communicate the at least one of content and software.

6. The method of claim 1, further comprising:
   applying provision information to interpret at least a portion of the information of the request; and
   comparing information interpreted from the request to information identifying the client logic.

7. An apparatus for authentication, the apparatus comprising:
   a processor; and
   logic that, when applied to the processor, results in connecting a wireless network to an HTTP network; converting wireless network protocols from the wireless network into a protocol supported by the HTTP network; comparing information, consisting of header types, a header order, and a header content, of a request by client logic with a known pattern of information for the client logic to determine whether a device making the request is authorized to receive at least one of content and software, wherein the header types, the header order, and the header content strongly identify the client logic; and when the information of the request matches the known pattern, causing the at least one of content and software to be communicated to the client logic in response to the request.

8. The apparatus of claim 7, further comprising:

logic that, when applied to the processor, results in selecting the known pattern according to an identification of the client logic provided with the request.

9. The apparatus of claim 7, further comprising HTTP proxy logic.

10. The apparatus of claim 7, further comprising:

logic that, when applied to the processor, results in combining information of the request to determine a value to represent the pattern of information in the request.

11. The apparatus of claim 9, further comprising:

logic that, when applied to the processor, results in causing an HTTP server to provide the at least one of content and software to the HTTP proxy; and in the HTTP proxy providing the at least one of content and software to the client logic.

12. The apparatus of claim 7, further comprising:

logic that, when applied to the processor, results in applying provision information to interpret at least a portion of the information of the request; and comparing interpreted information of the request to information of the request identifying the client logic.

13. A method of authentication, the method comprising:

connecting a wireless network to an HTTP network using an HTTP proxy;

converting wireless network protocols from the wireless network into a protocol supported by the HTTP network;

comparing information, consisting of header types, a header order, and a header content, of a request by client logic with a known pattern of information for the client logic to determine whether a device making the request is authorized to receive at least one of content and software, the comparing accomplished by the HTTP proxy, wherein the header types, the header order, and the header content strongly identify the client logic; and modifying the request information to either validate or invalidate the request according to whether the information of the request matches the known pattern.

14. The method of claim 13, further comprising:

the known pattern selected according to an identification of the client logic provided with the request.

15. The method of claim 13, further comprising:

the request comprising an HTTP request.

16. The method of claim 13, further comprising:

the known pattern of information comprising a value determined by combining units of information of the request.

17. The method of claim 13, further comprising:

the HTTP proxy causing an HTTP server to communicate at least one of content and software in response to the request.

18. The method of claim 13, further comprising:

applying provision information to interpret at least a portion of the information of the request; and comparing information interpreted from the request to information identifying the client logic.

\* \* \* \* \*